Patented Nov. 24, 1953

UNITED STATES PATENT OFFICE 2,659,986

METHOD OF DRYING HUMAN SERUM ALBUMIN AND OTHER HEAT SENSITIVE BIOLOGICALLY ACTIVE PROTEINS

John H. Hink, Jr., Berkeley, Calif., assignor to Cutter Laboratories, Berkeley, Calif., a corporation of California No Drawing. Application December 12, 1951, Serial No. 261,397

6 Claims. (Cl. 34—5)

This invention relates to and in general has for its object the provision of a method for effectively drying human serum albumin and other heat sensitive biologically active proteins.

One of the most important products of the fractionation of human plasma is human serum albumin. This protein alone represents more than half of the total proteins contained in plasma, and when the final purified albumin is obtained as a pasty precipitate consisting of approximately 25 per cent albumin, 30 per cent alcohol and 45 per cent water, it is necessary to remove all of the alcohol and it is desirable to remove all of the water so that the albumin can be stored indefinitely in a dry and stable state. Previously this has been accomplished only by freezing the albumin paste and subliming the alcohol and water from the ice under a high vacuum. Although albumin is a relatively stable protein as compared with most of the plasma proteins, the manner of its clinical usage requires that the albumin be maintained in virtually a native state and not be subjected to any appreciable degree of denaturation. Since albumin is a highly concentrated material for the emergency treatment of shock it must remain stable in a concentrated solution under all sorts of prevailing temperatures for periods of approximately five years.

The so called freeze drying process above referred to is objectionable in that it requires complex equipment and close attention over a period of many hours.

More specifically, the object of this invention is the provision of a method of drying human serum albumin and other heat sensitive biologically active proteins wherein a wet precipitate of albumin is frozen solidly, the frozen precipitate is ground into relatively small particles without permitting the particles to melt, the frozen ground particles are introduced into a body of anhydrous acetone having a low temperature, the mixture is violently stirred until all of its ice content has melted and its albumin content appears as a fine granular suspension, the albumin granules are allowed to settle and the supernatant is decanted off, the resulting albumin sludge is filtered, the filter cake is repulped in anhydrous acetone; the resulting suspension is filtered to recover the granular albumin and wherein finally the granular albumin so separated is air dried or dried in any other conventional manner.

By resorting to this procedure and more particularly to the expedient of violently stirring the frozen ground albumin precipitate in the anhydrous acetone, the water melting from the ice content of the precipitate is immediately dissolved by the acetone and uniformly dispersed throughout the entire body thereof, thus avoiding localized zones or areas of relatively highly diluted acetone. This is of extreme importance for although albumin is unaffected by anhydrous acetone, its stability in this and similar reagents decreases as the water content of the reagent increases. The trick is therefore to dissolve the water content of the albumin precipitate in the desired reagent without permitting any portion of the reagent to become diluted to the point at which it will become injurious to the albumin. The rate at which the frozen albumin precipitate particles are stirred in the body of acetone of course determines the rate at which the water melting from these particles is dissipated in the acetone and the rate at which melting proceeds depends upon the temperature of the frozen particles and the temperature of the acetone into which they are stirred.

Commercial scale example

Further objects and details of this invention will become apparent from the following example of a commercial scale operation:

As previously stated, albumin is recovered from plasma as a wet pasty precipitate containing approximately 25 per cent albumin, 30 per cent ethanol and 45 per cent water and has a pH range of 4.8 to 5.2. To prevent alcohol denaturation of the albumin the precipitate must be maintained at a temperature not higher than —5° C.

To dry this precipitate paste, 30 kilograms thereof are frozen solidly at —30° C. or below and then ground in an ice chopper into particles about the size of peas or small gravel while maintaining the material in a frozen state. This having been done the ground albumin precipitate is introduced into 300 liters of substantially anhydrous acetone maintained at a temperature of —20° C. or lower, and violently stirred therein until the entire water content of the particles has melted and all of the albumin appears as a fine granular suspension. This suspension will then settle rapidly whereupon the supernatant acetone mixture can be decanted off.

The albumin sludge is then filtered and the resulting sludge cake resuspended or repulped in about 90 liters of anhydrous acetone and refiltered. This final filter cake can then be dried in any conventional manner such as by passing air through it while supported on the filter medium. When the cake appears to be dry it is removed from the filter and the removal of acetone completed by air drying with or without the aid of a vacuum.

Although the temperatures of the albumin paste and acetone resorted to in the above example are not critical, as previously stated, they determine the rate at which the water content of the frozen albumin paste particles melt and therefore the degree of stirring required to avoid excessive dilution of the acetone at all points therein. The size of the albumin paste particles is also a factor influencing the rate at which the ice melts. The degree of total dilution of course depends upon the ratio of the water content of the albumin paste to the volume of acetone into which it is introduced. Although in the example above described the ratio of water to acetone is in the order of 4.5 per cent, as high as 8 per cent water and alcohol can be tolerated.

Theoretically, time is also a factor, for if albumin were permitted to stand for a considerable time in acetone containing only 4.5 per cent water, a portion of it probably would be rendered unstable. However, if the above process be carried out without any appreciable lapse of time between its various steps the time element may be disregarded.

Various batches of albumin dried in accordance with this process and redissolved as a 25 per cent solution in an appropriate aqueous diluent have met the regular stability tests specified by the National Institutes of Health and in every instance their stability was every bit as good as aliquots of the same starting material dried by the so-called freeze drying process.

More sensitive proteins, such as purified gamma globulin or diphtheria and tetanus antitoxins, which are also obtained as wet precipitates in an aqueous or a hydro-alcoholic medium, can also be dried by this process, provided sufficient care is taken to maintain the water content below approximately 2 per cent.

Suitable solvents other than acetone may be used, for example, methylethyl ketone, methylethyl ether and anhydrous methyl alcohol.

I claim:

1. The method of dehydrating wet serum albumin and other heat sensitive biologically active proteins comprising: freezing said precipitate and mechanically forming discrete particles thereof; introducing said frozen particles into a body of cold, highly volatile, water-miscible, organic liquid inert with respect to said protein; rapidly stirring said particles in said liquid so as quickly and uniformly to disperse therein water melting from the ice content of said particles and continuing said stirring until all of said ice content has been melted; and finally mechanically separating the ice-free protein precipitate particles from the resulting liquid mixture.

2. The method of dehydrating a bilogically active protein selected from the group consisting of serum albumin, gamma globulin, diphtheria antitoxin and tetanus antitoxin comprising: freezing said precipitate and mechanically forming discrete particles thereof; introducing said frozen particles into a relatively large body of a cold, highly volatile, water-miscible, organic liquid inert with respect to said protein; rapidly stirring said particles in said liquid so as quickly and uniformly to disperse therein water melting from the ice content of said particles; continuing said stirring until all of said ice content has been melted and the water resulting therefrom has been uniformly dispersed in said liquid; and then mechanically separating the protein precipitate from the resulting liquid mixture.

3. The method of dehydrating wet serum albumin and other biologically active proteins comprising: freezing said albumin and mechanically forming discrete particles thereof; introducing said frozen particles into a relatively large body of a cold, highly volatile, water-miscible organic solvent selected from the group consisting of acetone, methylethyl ketone, methylethyl ether and anhydrous methyl alcohol; rapidly stirring said particles in said solvent so as quickly and uniformly to disperse therein, water melting from the ice content of said particles; continuing said stirring until all of said ice content has been melted and the water resulting therefrom has been uniformly dispersed in said solvent; and then mechanically separating the protein precipitate from the resulting solvent mixture.

4. The method of dehydrating wet biologically active proteins selected from the group consisting of serum albumin, gamma globulin, diphtheria antitoxin and tetanus antitoxin comprising: freezing said albumin and mechanically forming discrete particles thereof; introducing said frozen particles into a relatively large body of a cold, highly volatile, water-miscible organic solvent selected from the group consisting of acetone, methylethyl ketone, methylethyl ether and anhydrous methyl alcohol; rapidly stirring said particles in said solvent so as quickly and uniformly to disperse therein, water melting from the ice content of said particles; continuing said stirring until all of said ice content has been melted and the water resulting therefrom has been uniformly dispersed in said solvent; and then mechanically separating the protein precipitate from the resulting solvent mixture.

5. The method of dehydrating wet serum albumin wherein: a volume of said precipitate is frozen and mechanically formed into discrete particles; said particles are introduced into a substantially large volume of anhydrous acetone; said particles are rapidly stirred in said acetone until their ice content has been completely melted; and the albumin precipitate is then mechanically separated from said acetone and wherein the volume of albumin precipitate, the temperature to which it is frozen, the size of said particles, the volume of said acetone and the degree of stirring are so correlated that the water content in said acetone is never in excess of 8 per cent of the solvent mixture.

6. The method of dehydrating serum albumin comprising: freezing a unit volume of said precipitate to a temperature in the order of $-30°$ C. and mechanically forming discrete particles thereof; introducing said particles into about ten unit volumes of anhydrous acetone cooled to a temperature in the order of $-20°$ C., rapidly stirring said particles in said acetone so as quickly and uniformly to disperse therein, water melting from the ice content of said particles; continuing said stirring until all of said ice content has been melted and the water resulting therefrom has been uniformly dispersed in said acetone; and then mechanically separating the alumbin precipitate from said acetone and drying the precipitate so recovered in a desired manner.

JOHN H. HINK, Jr.

References Cited in the file of this patent

UNITED STATES PATENTS

| Number | Name | Date |
| --- | --- | --- |
| Re. 20,969 | Reichel | Jan. 3, 1939 |

OTHER REFERENCES

Greenberg, Amino Acids and Proteins, Charles C. Thomas, Publisher, page 270 (1951).

Krishnan et al., Indian Med. Gaz. 79,304 (1904); through J. Am. Ph. Assoc., Sc. Ed., page 206, August 1945.